United States Patent
Yu et al.

(10) Patent No.: US 7,288,901 B1
(45) Date of Patent: Oct. 30, 2007

(54) BALLAST WITH ARC PROTECTION CIRCUIT

(75) Inventors: Qinghong Yu, Reading, MA (US); Grigoriy A. Trestman, Salem, MA (US); John Konopka, Deer Park, IL (US); Joseph L. Parisella, Beverly, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 11/532,277

(22) Filed: Sep. 15, 2006

(51) Int. Cl.
*G05F 1/00* (2006.01)

(52) U.S. Cl. ............ 315/291; 315/274; 315/312; 315/247; 315/307

(58) Field of Classification Search ........ 315/291, 315/307, 224, 225, 247, 246, 274–287, 312, 315/322–325
See application file for complete search history.

(56) References Cited

U.S. PATENT DOCUMENTS

| | | | |
|---|---|---|---|
| 4,488,199 A | 12/1984 | Bloomer | |
| 5,619,105 A | 4/1997 | Holmquest | |
| 5,751,115 A | 5/1998 | Jayaraman et al. | |
| 5,751,120 A | 5/1998 | Zeitler et al. | |
| 5,770,925 A | 6/1998 | Konopka et al. | |
| 5,777,439 A | 7/1998 | Hua | |
| 5,872,429 A | 2/1999 | Xia et al. | |
| 5,883,473 A | 3/1999 | Li et al. | |
| 5,945,788 A | 8/1999 | Li et al. | |
| 6,023,132 A * | 2/2000 | Crouse et al. | 315/307 |
| 6,037,722 A | 3/2000 | Moisin | |
| 6,222,322 B1 | 4/2001 | Stack | |
| 6,292,339 B1 | 9/2001 | Brooks | |
| 6,400,095 B1 | 6/2002 | Primisser et al. | |
| 6,720,739 B2 | 4/2004 | Konopka | |
| 6,809,483 B2 | 10/2004 | Alexandrov | |
| 7,042,161 B1 | 5/2006 | Konopka | |
| 7,102,297 B2 | 9/2006 | Trestman et al. | |
| 2002/0113559 A1 | 8/2002 | Lam | |
| 2005/0046357 A1 | 3/2005 | Stack | |

* cited by examiner

*Primary Examiner*—Tuyet Vo
(74) *Attorney, Agent, or Firm*—Carlo Bessone

(57) ABSTRACT

A ballast (20) for powering one or more gas discharge lamps (70,72,74,76) comprises an inverter (200), an output circuit (300), and an arc protection circuit (400). Arc protection circuit (400) monitors an electrical signal within the output circuit (300). When an arcing condition occurs at the ballast output connections (302,304,306,308,310), the electrical signal includes a high frequency component having a fundamental frequency that is much greater than the normal operating frequency of the inverter (200). In response to the high frequency component exceeding a predetermined threshold, arc protection circuit (400) disables the inverter (200) for a predetermined shutdown period. Arc protection circuit (400) also provides a restart function for periodically attempting to ignite and operate the lamps. Arc protection circuit (400) is preferably realized using a microcontroller integrated circuit (440) with associated discrete circuitry, and is especially well-suited for use in ballasts for powering multiple lamps via a current-fed self-oscillating inverter and an isolated parallel resonant output circuit.

19 Claims, 3 Drawing Sheets

BALLAST WITH ARC PROTECTION CIRCUIT

FIELD OF THE INVENTION

The present invention relates to the general subject of circuits for powering discharge lamps. More particularly, the present invention relates to a ballast that includes a circuit for protecting against output arcing.

RELATED APPLICATIONS

The subject matter of the present application is related to that of U.S. Pat. No. 6,720,739 B2 (titled "Ballast with Protection Circuit for Quickly Responding to Electrical Disturbances," issued on Apr. 13, 2004, and assigned to the same assignee as the present application), U.S. Pat. No. 7,042,161 B1 (titled "Ballast with Arc Protection Circuit," issued on May 9, 2006, and assigned to the same assignee as the present application), U.S. Pat. No. 7,102,297 B2 (titled "Ballast with End-of-Lamp-Life Protection Circuit," issued on Sep. 5, 2006, and assigned to the same assignee as the present application), and U.S. patent application Ser. No. 11/532,235 (titled "Ballast with Frequency-Diagnostic Lamp Fault Protection Circuit," filed on the same date, and assigned to the same assignee, as the present application), the disclosures of which are incorporated herein by reference.

BACKGROUND OF THE INVENTION

Electronic ballasts generally include an inverter that provides high frequency current for efficiently powering gas discharge lamps. Inverters are commonly classified according to switching topology (e.g., half-bridge or push-pull) and the method used to control commutation of the inverter switches (e.g., driven or self-oscillating). In many types of electronic ballasts, the inverter provides an output voltage that is processed by a resonant output circuit to provide a high voltage for igniting the lamps and a magnitude-limited current for powering the lamps.

Ballasts for gas discharge lamps provide high ignition voltages for starting the lamps. The ignition voltages supplied by preheat type ballasts are typically on the order of several hundred volts (e.g., 500 volts peak), while those provided by instant-start type ballasts may approach 800 volts peak. As a consequence of these high ignition voltages, ballasts are subject to a special type of lamp fault condition that is commonly referred to as output arcing.

Output arcing may occur in any of a number of different ways. For example, in fluorescent lighting installations, it is a common practice to replace failed lamps while AC power is applied to the ballast. This practice is referred to as "live" relamping. During live relamping, as a lamp is being removed or inserted, a momentary arc may form between the fixture socket contacts and a pin of the lamp. As another example, a sustained arc (as opposed to a momentary arc) may occur due to poor or faulty connections in the output wiring or the lamp sockets, or if a lamp is improperly installed in such a way that a small gap exists between the lamp pins and the contacts within the fixture sockets. If a connection to a lamp is compromised due to a defective lamp socket or defective wiring, a high intensity, high temperature arc may be produced across the air gap caused by those faulty connections.

Arcing is generally acknowledged to cause degradation of the contacts in the fixture sockets and undue stress on components within the ballast. Sustained arcing is especially undesirable because of its tendency to produce potentially destructive heating. In order to minimize any ill effects due to arcing, it is important that the arc be promptly extinguished. This requires a ballast that is capable of quickly and reliably detecting an arc and, subsequently, taking appropriate action to promptly extinguish the arc.

The prior art includes a number of circuits for detecting and/or protecting against output arcing, such as those which are disclosed in U.S. Pat. Nos. 6,720,739 B2 (Konopka) and 7,042,161 B1 (Konopka). The circuitry disclosed in both of those patents appears to represent a considerable advance over the prior art.

Many existing ballasts with arc protection circuits respond to an output arcing condition by shutting down the inverter and then keeping the inverter off for as long as power continues to be applied to the ballast. With such ballasts, following elimination of an output arcing condition, it is required that power to the ballast be turned off and then on again (i.e., "cycled") in order to effect ignition and powering of the lamps in the fixture. This requirement poses a considerable inconvenience in many applications, such as in large office areas or factories, in which a large number of ballasts are often connected in the same branch circuit. In such environments, with many existing ballasts, it is necessary to momentarily interrupt the lighting in a large area in order to restore desired operation to even a single lighting fixture after one or more of its lamps are replaced. It is thus desirable to have a ballast that accommodates relamping without requiring that the power to the ballast be removed and reapplied.

It is also important that arc detection be inhibited during certain operating periods, such as inverter startup and lamp ignition. For instance, the normal starting process of the inverter and lamps is generally accompanied by the same types of electrical disturbances that occur during an arc condition. Thus, unless arc detection is inhibited during inverter startup and lamp ignition, the inverter may be prevented from properly starting and/or the ballast may be prevented from properly igniting the lamp. Additionally, although most lamps are capable, under ideal conditions, of igniting and operating normally within a short period of time (e.g., 20 milliseconds), some lamps, due to age or low temperature, require a much longer time to ignite and stabilize. Thus, arc detection should be inhibited for a period that is long enough (e.g., at least 200 milliseconds or so) to accommodate lamp starting under conditions that are less than ideal.

It is further desirable that a ballast possess some type of automatic restart capability wherein, within a specified time following detection of an arc condition and shutdown of the inverter, periodic attempts are made to restart the ballast and ignite the lamp. This feature is desirable in order to prevent a "latched" shutdown of the ballast (which necessitates that power to the ballast be turned off and then on again in order to reset the ballast) in the event of false detection due to a momentary power line transient or any of a number of anomalous phenomena (e.g., electrical noise) that pose no real threat to ballast reliability or safety. Also, because lamps are somewhat unpredictable, it is possible that an otherwise "good" lamp may sometimes fail to properly start on the first attempt. In such a case, a ballast with automatic restart capability will periodically attempt to start the lamp, rather than simply latching the ballast or its inverter in a shutdown state until such time as the power to the ballast is cycled.

For a ballast that powers multiple lamps and that includes automatic restart capability, in the event of a recurrent arc condition (i.e., an arc condition that continues to reoccur over an extended period of time such as, e.g., hours, days, weeks, months, etc.), the periodic (but unsuccessful) attempts to restart the ballast and ignite the lamps results in a regular (e.g., once per second) brief flashing of any remaining operational lamp(s). This regular brief flashing, which occurs on a sustained basis until either the arc condition is corrected or power is removed from the ballast, is considered to be visually annoying to occupants who are in the vicinity of the affected lighting fixture. Additionally, the periodic restart attempts are stressful to the components within the ballast. Thus, a need exists for an arc protection approach that not only minimizes visual annoyance to occupants, but that also avoids placing unnecessary stress upon the ballast components.

Yet another shortcoming of many existing approaches to arc protection is that those circuits often require a considerable amount of operating power. Typically, the operating power requirements increase with circuit complexity, especially when analog circuitry is extensively employed. Consequently, those circuits significantly detract from the overall energy efficiency of the ballast. Thus, a further need exists for an arc protection circuit that, in comparison with existing approaches, has relatively modest operating power requirements.

Ballasts with a current-fed self-oscillating inverter and a parallel resonant output circuit are currently the prevailing "instant start" design topology in North America. However, providing reliable arc protection within these types of ballasts presents a significant engineering challenge. In particular, many prior art approaches are susceptible to problems relating to arc detection resolution, and are therefore ill-suited for ballasts that power multiple (e.g., three or four) lamps. For example, in a ballast for powering three or four lamps and in the case of an arc condition that involves only one lamp or one lamp socket, any signal that is intended to be indicative of an arc condition may be "swamped out" by the fact that the remaining lamps and sockets are operating in a substantially normal manner. Because of this problem, one existing approach has been to provide a separate inverter and output circuit for each of the lamps powered by the ballast; such an approach has the obvious disadvantage of being quite expensive, especially for ballasts that power three or four lamps (in which case three or four separate inverters and output circuits are required).

The output wiring that is present between the output of the ballast and the lamp fixture introduces a certain amount of stray capacitance. That stray capacitance may impact the ability of an arc protection circuit to reliably detect the presence of an arc condition. Accordingly, a need exists for an arc detection circuit that is capable of accounting for any effects due to stray capacitances.

Thus, a need exists for a ballast having an arc protection circuit that is capable of reliably detecting an output arc condition (especially in the context of a multi-lamp ballast and in the face of stray capacitances due to wiring between the ballast and fixture(s), etc.). A need also exists for a ballast and arc protection circuit that provides a starting (i.e., inhibit) period in order to allow for proper lamp starting, as well as automatic restart capability in order to accommodate false detection and anomalous starting failure of a "good" lamp, but in a manner that minimizes visually annoying flashing and unnecessary stress to ballast components when an arc condition continues to reoccur over an extended period of time. A further need exists for an arc protection circuit with modest operating power requirements. A further need exists for an arc protection circuit that provides all of the aforementioned functional benefits, and that is readily and economically implemented within existing ballasts. Such a ballast and arc protection circuit would represent a considerable advance over the prior art.

DETAILED DESCRIPTION OF THE PREFERRED EMBODIMENTS

Figure 1:
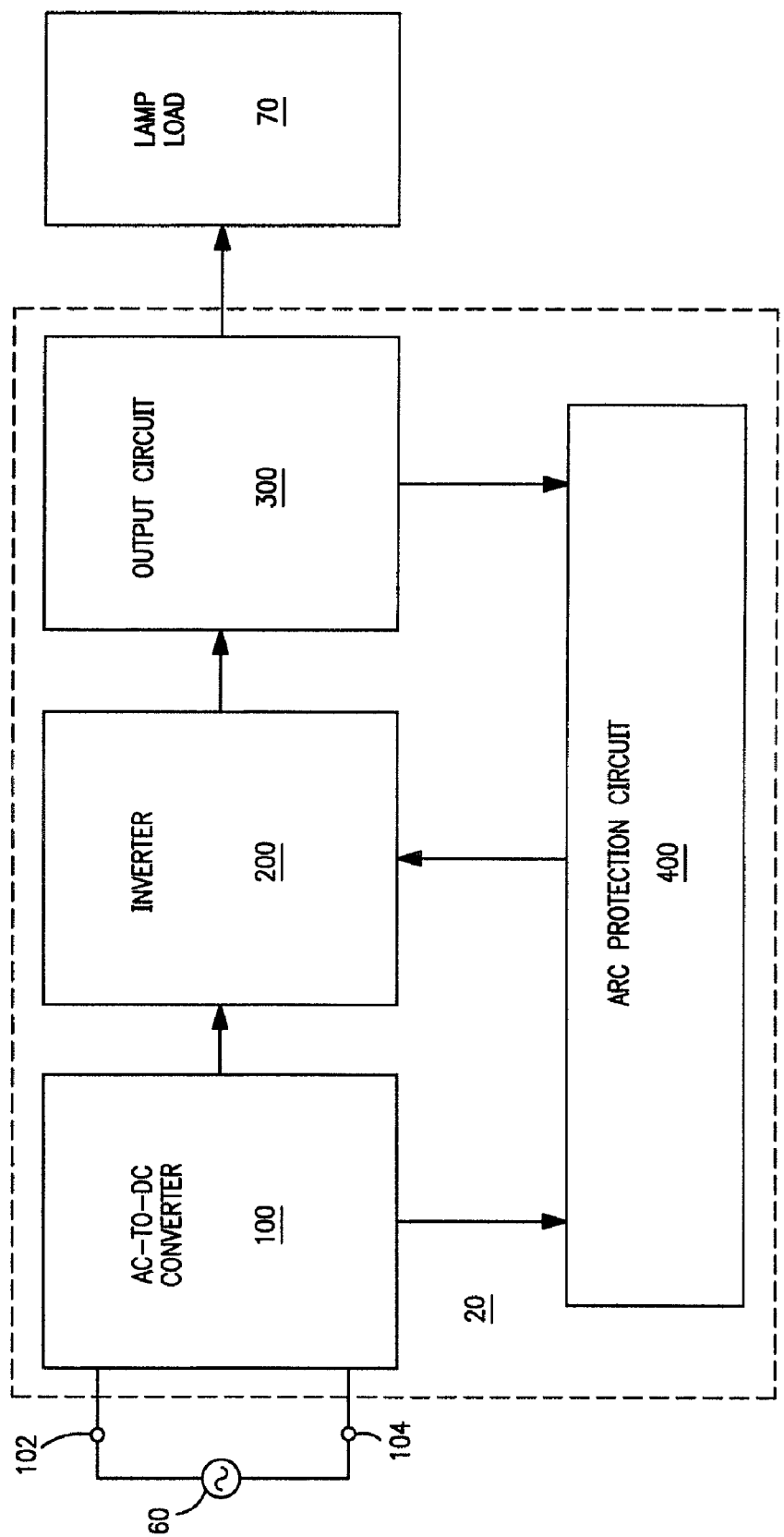
FIG. 1 is a block electrical diagram of a ballast with an arc protection circuit, in accordance with the preferred embodiments of the present invention.

Referring to FIG. 1, a ballast 20 for powering a lamp load 70 (that includes one or more gas discharge lamps) comprises an AC-to-DC converter 100, an inverter 200, an output circuit 300, and an arc protection circuit 400. AC-to-DC converter 100 has inputs 102,104 for receiving an AC supply voltage 60 (e.g., 277 volts rms at 60 hertz). During operation, AC-to-DC converter 100 provides a DC rail voltage to inverter 200. Inverter 200 is characterized by having a normal operating frequency (e.g., 40 kilohertz); that is, the operating frequency of inverter 200 is normal when at least each of the lamps within lamp load 70 is operating in substantially normal manner, and when at least no arc condition is present at any of the sockets within the lighting fixture to which the lamps (within lamp load 70) are connected. Output circuit 300 is coupled to inverter 200, and is adapted for coupling to lamp load 70. Arc protection circuit 400 is coupled to inverter 200 and output circuit 300; optionally, lamp fault protection circuit 400 is also coupled to AC-to-DC converter 100.

During operation, arc protection circuit 400 monitors an electrical signal within output circuit 300 for indication of an arc condition. When ballast 20 and lamp load 70 are operating in a normal manner, the electrical signal within output circuit 300 will be a periodic signal having a predetermined normal fundamental frequency (e.g., 40 kilohertz) corresponding to the normal operating frequency of inverter 200. An arc condition is deemed to have occurred when the electrical signal includes a high frequency (i.e., having a frequency that is substantially higher than the normal operating frequency of the inverter) component having two characteristics: (i) a magnitude that exceeds a predetermined threshold value; and (ii) a fundamental frequency that is on the order of at least ten times greater than the normal operating frequency (e.g., 40 kilohertz) of inverter 200.

During operation, arc protection circuit 400 provides a starting period during which inverter 200 is enabled and allowed to attempt to start the lamps, regardless of whether or not an arc condition appears to be present. Thus, arc protection is effectively inhibited during the starting period. Inhibition of arc protection during the starting period is desirable because the normal starting process of a lamp is generally accompanied by disturbances (in the monitored electrical signal within output circuit 300) which may be indistinguishable from a legitimate arc condition. Preferably, the starting period is chosen to be between about 200 milliseconds and about one second, which typically provides sufficient time to allow the lamp(s) to ignite and stabilize, even under conditions involving aged lamps or low ambient temperatures.

After completion of the starting period, if an arc condition is present (as indicated by the presence of a substantial high frequency signal in the monitored electrical signal within output circuit 300), arc protection circuit 400 disables inverter 200 and keeps the inverter disabled for a shutdown period. Preferably, the shutdown period is chosen to have a time duration that is, at least initially, on the order of about one second or so; in the event of a recurring arc condition, the duration of the shutdown period is preferably increased by a substantial amount (preferably, on the order of at least five seconds or so).

When an arc condition occurs, arc protection circuit 400 reliably detects the arc condition and then promptly disables inverter 200. As alluded to previously, an arc condition is accompanied by the presence of a high frequency component (having a fundamental frequency on the order of, e.g., at least ten times greater than the normal operating frequency of inverter 200) of at least a predetermined magnitude in the monitored signal within output circuit 300. Arc protection circuit 400 detects this high frequency component, disables inverter 200, and then ensures that inverter 200 remains disabled for at least the duration of the shutdown period.

After completion of the shutdown period, arc protection circuit 400 again provides a starting period, during which time inverter 200 is re-enabled and allowed to attempt to start the lamp, independent of whether or not an arc condition appears to be (or is in fact) present. This feature not only accommodates re-lamping (wherein a failed lamp may be replaced, and subsequently ignited and operated, without requiring that power to the ballast be removed and then reapplied), but also allows the ballast and lamps to recover from situations such as "false detection" (wherein a legitimate arc condition appears to be present, but in reality is not) and anomalous starting failure (wherein a "good" lamp does not ignite on the first attempt, but does so after one or more successive attempts).

Preferably, arc protection circuit 400 is configured such that, if an arc condition continues to reoccur after a predetermined number (e.g., 10 or so) of starting periods have been successively provided (e.g., a first starting period, followed by a first shutdown period, following by a second starting period, following by a second shutdown period, . . . , followed by a tenth starting period), the shutdown period is increased from a first duration (e.g., the normal initial shutdown period of about 1 second or so) to a second duration (e.g., about 5 seconds or so), and is then maintained at the second duration until at least such time as the arc condition no longer occurs. This feature replaces a sustained rapid (i.e., once per second or so) flashing of any remaining operational lamps with a sustained occasional (i.e., once every 5 seconds or so) flashing of any remaining operational lamps, thereby greatly reducing the visual annoyance to occupants. Additionally, because inverter 200 is restarted much less frequently than before (e.g., once every 5 seconds or so instead of once every second or so), this feature dramatically reduces the frequency with which the components within ballast 20 are subjected to the considerable electrical stresses that typically accompany inverter startup and lamp ignition; it is thus expected that this feature contributes to enhancing the useful operating life of ballast 20.

Figure 2:
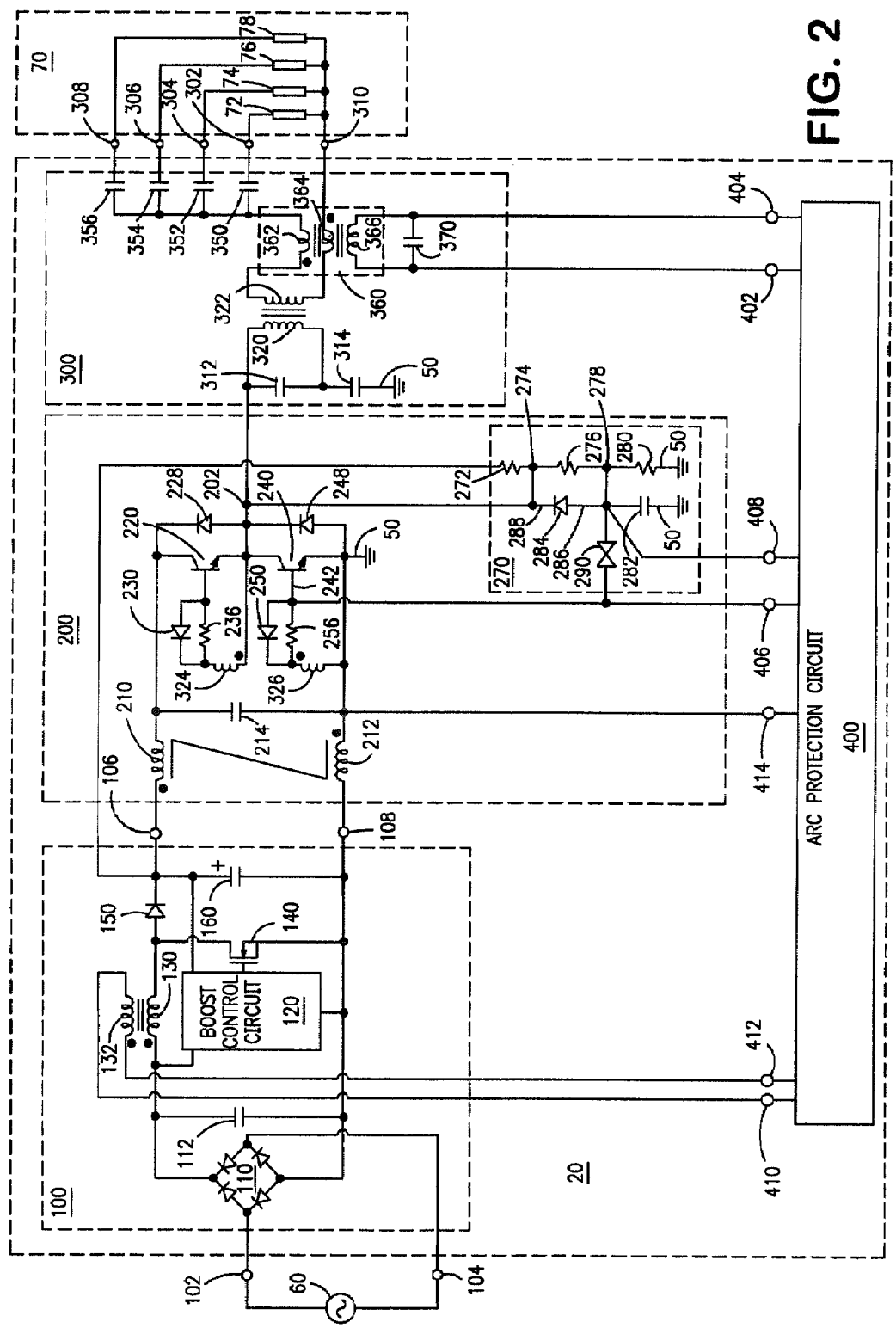
FIG. 2 is a partial block diagram schematic of a ballast with an arc protection circuit and a current-fed self-oscillating half-bridge type inverter, in accordance with a preferred embodiment of the present invention.

Turning now to FIG. 2, in a preferred embodiment of the present invention, AC-to-DC converter 100 is preferably realized as a combination of a full-wave rectifier circuit 110 and a boost converter 120,130,140,150,160. Inverter 200 is preferably implemented as a current-fed self-oscillating half-bridge type inverter, and output circuit 300 is preferably implemented as a parallel resonant output circuit.

As described in FIG. 2, AC-to-DC converter 100 comprises input terminals 102,104, a full-wave diode bridge 110, a capacitor 112, a boost control circuit 120, a boost inductor 130, a boost transistor 140, a boost rectifier 150, a bulk capacitor 160, and output terminals 106,108. During operation, AC-to-DC converter receives (via input terminals 102, 104) an AC supply voltage (e.g., 277 volts rms at 60 hertz) from AC source 60 and provides (via output terminals 106,108) a regulated DC rail voltage (e.g., 455 volts) to inverter 200.

Inverter 200 preferably comprises dual current-feed inductors 210,212, first and second inverter transistors 220, 240, a first base drive circuit 230,236,324, a second base drive circuit 250,256,326, and an inverter startup circuit 270. The first base drive circuit (for first inverter transistor 220) is coupled to first inverter transistor 220, and comprises a base drive winding 324, a diode 230, and a resistor 236. The second base drive circuit (for second inverter transistor 240) is coupled to second inverter transistor 240, and comprises a base drive winding 326, a diode 250, and a resistor 256. Inverter startup circuit 270 is coupled to AC-to-DC converter 100, second inverter transistor 240, and inverter ground 50, and includes resistors 272,276,280, capacitor 282, diode 284, and diac 290. During operation, inverter 200 receives the DC rail voltage from AC-to-DC converter 100 and provides (via complementary switching of inverter transistors 220,240) a high frequency (e.g., greater than 20,000 hertz) alternating voltage to output circuit 300. Inverter startup circuit 270 provides a startup pulse (to second inverter transistor 240) for initially activating inverter 200.

Output circuit 300 comprises output connections 302,304, 306,308,310, a resonant capacitor 312, an output transformer 320,322,324,326, a DC blocking capacitor 314, ballasting capacitors 350,352,354,356, a sensing transformer 360, and a tuning capacitor 370. Output transformer 320,322,324,326 includes a primary winding 320 coupled to inverter 200, a secondary winding 322 coupled to output connections 302,304,306,308,310, a first auxiliary winding 324 that is part of the first base drive circuit within inverter 200, and a second auxiliary winding 326 that is part of the second base drive circuit within inverter 200. Sensing transformer 360 includes a first primary winding 362, a second primary winding 364, and a secondary winding 366. First primary winding 362 is coupled between secondary winding 322 of output transformer 320,322,324,326 and at least first output connection 302; optionally, for a ballast that powers four lamps (as illustrated in FIG. 2), first primary winding 362 is coupled to each of the first, second, third, and fourth output connections 302,304,306,308. Second primary winding 364 is coupled between secondary winding 322 of output transformer 320,322,324,326 and return output connection 310. Secondary winding 366 is magnetically coupled to first and secondary primary windings 362,364. First and secondary primary windings 362,364 are orientated as indicated by the dots on each winding, as illustrated in FIG. 2. Advantageously, sensing transformer 360 includes dual primary windings 362,364 (with the orientations illustrated in FIG. 2) in order to compensate for effects due to stray capacitances in the wiring between ballast output connections 302,304,306,308,310 and the sockets of the fixture(s) to which lamp load 70 is connected. More particularly, the provision for dual primary windings 362,364 in sensing transformer 360 ensures that an arc condition is reliably reflected in the voltage that develops across secondary winding 364, even if stray capacitances (attributable to the output wiring) were to significantly attenuate the resulting high frequency signal; for instance, if sensing transformer 360 were to include only a single primary winding (say, primary winding 362, but not primary winding 364), any high frequency signal attributable to an arc condition which occurs at those lamp sockets that are proximate to return connection 310 might be significantly attenuated (by stray capacitances in the wiring between those sockets and return output connection 310) and thereby compromise the ability of arc protection circuit 400 to reliably detect occurrence of an arc condition at those lamp sockets. Thus, output circuit 300 and arc protection circuit 400 are configured to compensate for any detection problems attributable to the stray capacitances inherent in the output wiring between ballast 20 and the fixture(s) containing lamp load 70. Tuning capacitor 370 is coupled in parallel with secondary winding 366 of sensing transformer 360. During operation, output circuit 300 receives the high frequency alternating voltage provided by inverter 200 and supplies (via output connections 302,304,306,308,310) a high voltage for igniting, and a magnitude-limited current for operating, the lamps 72,74, 76,78 within lamp load 70. Preferably, the voltage across tuning capacitor 370 (and, correspondingly, the voltage across secondary winding 366 of sensing transformer 360) is the electrical signal within output circuit 300 that is monitored by arc protection circuit 400 for indication of an arc condition.

Because most of the details concerning the structure and operation of AC-to-DC converter 100, inverter 200, and output circuit 300 are well known to those skilled in the art of electronic ballasts, a comprehensive detailed description of the structure and operation of those circuits is not presented herein. However, for purposes of understanding the present invention, it should be appreciated that, during operation of ballast 20, sensing transformer 360 essentially senses two currents: (i) a first current that, in aggregate, flows out of ballast 20 via output connections 302,304,306, 308; and (ii) a second current that flows back into ballast 20 via return output connection 310. When an arc condition occurs, either one or both of the first and second currents will include a high frequency component; this high frequency component will be reflected in the voltage that develops across secondary winding 366 of sensing transformer 360 and tuning capacitor 370. Importantly, sensing transformer 360 has a secondary-side magnetizing inductance that, in combination with the capacitance of tuning capacitor 370, constitutes a parallel resonant circuit having a natural resonant frequency that is selected to be on the order of at least ten times greater than the normal operating frequency of inverter 200; preferably, when the normal operating frequency of inverter 200 is on the order of tens of kilohertz, the natural resonant frequency of the parallel resonant circuit is selected to be in the range of several hundreds of kilohertz to several megahertz. The parallel resonant circuit is tuned to detect any high frequency component in the voltage across secondary winding 366 of sensing transformer 360 and tuning capacitor 370, thereby providing a voltage signal (between first and second connections 402,404 of arc protection circuit 400) having a magnitude that is sufficient to indicate (to arc protection circuit 400) the presence of an arc condition.

As described in FIG. 2, arc protection circuit 400 has a plurality of connections 402,404,406,408,410,412,414. First and second connections 402,404 are coupled to tuning capacitor 370 and secondary winding 366 of sensing transformer 360 (within output circuit 300). Third connection 406 is coupled to second inverter transistor 240 and second base drive circuit 250,256,326; more particularly, third connection 406 is coupled to the base 242 of inverter transistor 240. Fourth connection 408 is coupled to inverter startup circuit 270; more particularly, fourth connection 408 is coupled to a node 278 at the junction of capacitor 282 and diac 290 within inverter startup circuit 270. Fifth and sixth connections 410,412 are coupled to AC-to-DC converter 100; more particularly, fifth and sixth connections 410,412 are coupled to an auxiliary winding 132 of boost inductor 130. Finally, seventh connection 414 is coupled to inverter ground 50.

Referring to FIG. 2, during operation, arc protection circuit 400 monitors, via first and second connections 402, 404, a voltage signal ($V_X$) that is present across both tuning capacitor 370 and secondary winding 366 of sensing transformer 360. As previously alluded to, $V_X$ reflects any high frequency component (having a fundamental frequency that is, e.g., at least ten times greater than the normal operating frequency of the inverter) that is present in the current provided to lamp load 70 via output circuit 300. When $V_X$ includes a high frequency component having a magnitude that exceeds a predetermined value, an arc condition is deemed to be present. During the starting period, inverter 200 is enabled and allowed to attempt to ignite lamps 72,74,76,78, regardless of whether or not an arc condition is, or appears to be, present. After completion of the starting period, if the magnitude of $V_X$ is above a predetermined value, arc protection circuit 400 responds by effectively shunting third and fourth connections 406,408 to a negative voltage, $V_{NEG}$, within arc protection circuit 400 for the duration of the shutdown period. As will be explained in further detail below, $V_{NEG}$ is a negative voltage having a suitable magnitude, such as −5 volts, that is provided by arc protection circuit 400 and that exists between a reference node (within arc protection circuit 400) and inverter ground 50). By shunting third connection 406 to $V_{NEG}$ (i.e., which is at a somewhat lower potential than inverter ground 50), arc protection circuit 400 ensures that inverter 200 is promptly and reliably disabled in response to an arc condition. Shunting fourth connection 408 to $V_{NEG}$ for the duration of the shutdown period prevents inverter startup circuit 270 from attempting to restart inverter 200 during the shutdown period. Upon completion of the shutdown period, arc protection circuit 400 ceases to effectively shunt third and fourth connections 406,408 to the negative voltage $V_{NEG}$. Consequently, inverter 200 is reenabled (i.e., allowed to restart and operate for at least the duration of the starting period).

Figure 3:
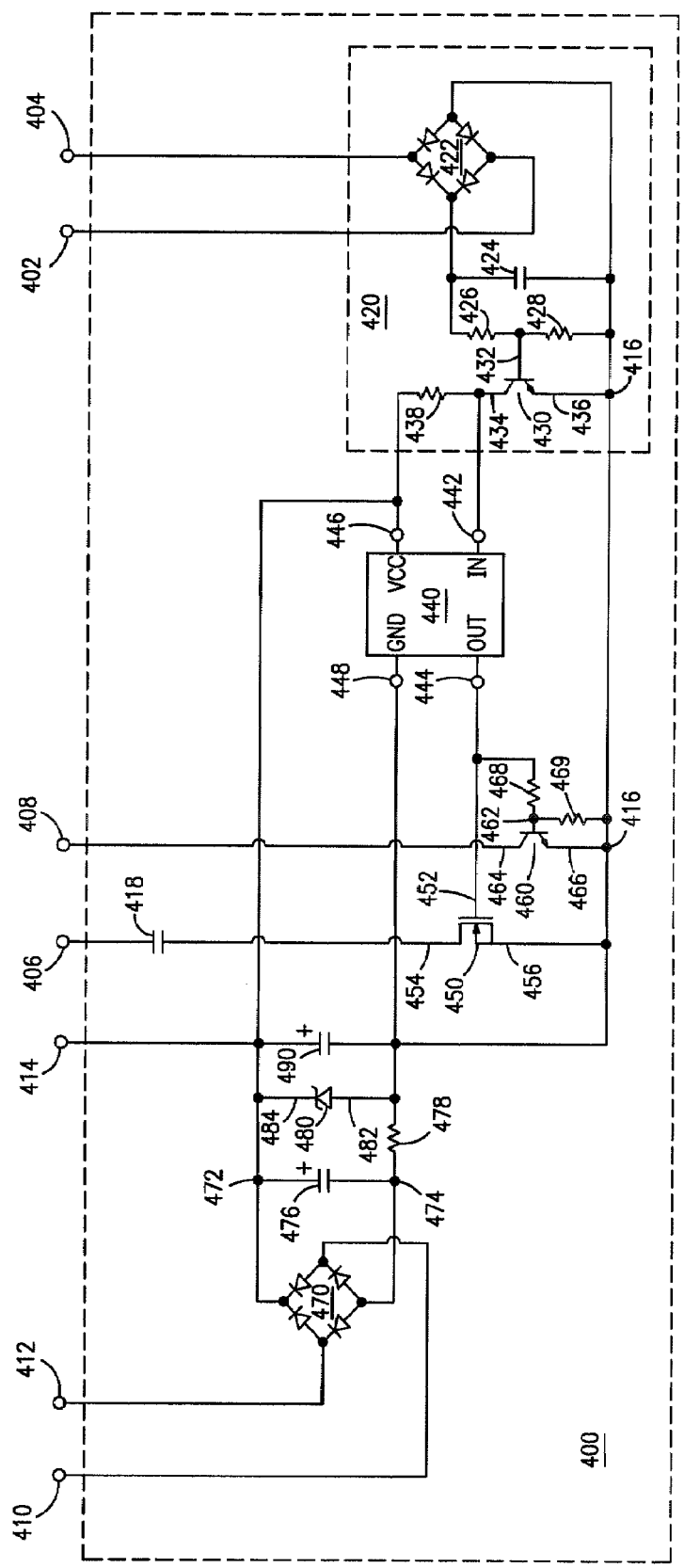
FIG. 3 is a detailed schematic diagram of an arc protection circuit for use in the ballast of FIG. 2, in accordance with a preferred embodiment of the present invention.

Turning now to FIG. 3, in a preferred embodiment of the present invention, arc protection circuit 400 comprises a detection circuit 420, a microcontroller 440, a first shunting circuit 418,450, a second shunting circuit 460,468, and a DC voltage supply circuit 470,476,478,480,490. Microcontroller 440 includes an input 442, an output 444, a DC supply input 446, and a ground input 448. DC supply input 446 is coupled to seventh connection 414 (which is coupled to inverter ground 50). Ground input 448 is coupled to a reference node 416. As will be described in further detail herein, reference node 416 has a voltage, $V_{NEG}$, that is negative (e.g., −5 volts or so) with respect to inverter ground 50. First shunting circuit 418,450 is coupled to third connection 406, output 444 of microcontroller 440, and reference node 416. Second shunting circuit 460,468 is coupled between fourth connection 408, output 444 of microcontroller 440, and reference node 416. DC voltage supply circuit 470,476,478,480,490 is coupled to fifth and sixth connections 410,412, DC supply input 446 of microcontroller 440, and reference node 416.

Preferably, as described in FIG. 3, first shunting circuit 418,450 comprises a first electronic switch 450 and a first capacitor 418. First electronic switch 450 is preferably realized by a N-channel field effect transistor (FET) having a first (i.e., gate) terminal 452, a second (i.e., drain) terminal 454, and a third (i.e., source) terminal 456. First terminal 452 is coupled to output 444 of microcontroller 440. Third terminal 456 is coupled to reference node 416. First capacitor 418 is coupled between third connection 406 and second terminal 454 of first electronic switch 450. During operation of arc protection circuit 400, first shunting circuit 418,450 functions to disable inverter 200 in response to an arc condition by effectively coupling the base 242 of inverter transistor 240 to reference node 416 via capacitor 418. Because reference node 416 has a negative voltage (e.g., −5 volts with respect to inverter ground 50), inverter 200 is promptly and reliably disabled following activation of first electronic switch 450.

As described in FIG. 3, detection circuit 420 preferably comprises a first rectifier circuit 422, a second capacitor 424, a second electronic switch 430, a first resistor 426, a second resistor 428, and a third resistor 438. First rectifier circuit 422 is preferably realized as a full-wave diode bridge that is coupled to first and second connections 402,404. Second capacitor 424 is coupled between first rectifier circuit 422 and reference node 416. Second electronic switch 430 is preferably realized as a NPN bipolar junction transistor (BJT) having a first (i.e., base) terminal 432, a second (i.e., collector) terminal 434, and a third (i.e., emitter) terminal 436. Third terminal 436 is coupled to reference node 416. First resistor 426 is coupled between first rectifier circuit 422 and first terminal 432 of second electronic switch 430. Second resistor 428 is coupled between first terminal 432 of second electronic switch 430 and reference node 416. Third resistor 438 is coupled between DC supply input 446 of microcontroller 440 and second terminal 434 of second electronic switch 430. During operation, detection circuit 420 functions as a peak detector circuit. More particularly, detection circuit 420 full-wave rectifies (via rectifier circuit 422) and filters (via capacitor 424) the voltage signal across tuning capacitor 370 and secondary winding 366 of sensing transformer 360; as previously explained, the voltage signal across tuning capacitor 370 and secondary winding 366 will have an appreciable magnitude when a substantial high frequency component (which is indicative of an arc condition) appears in the currents that flow through primary windings 362,364. Within detection circuit 420, resistors 426,428 function as a voltage divider that determines an appropriate triggering level for transistor 430; more particularly, when the filtered voltage across capacitor 424 exceeds a predetermined threshold, sufficient voltage is provided between base 432 and emitter 436 of transistor 430 in order to activate (i.e., turn on) transistor 430. With transistor 430 turned on, the voltage provided to input 442 of microcontroller 440 goes from high (e.g., +5 volts or so, taken with respect to reference node 416) to low (e.g., about 0.2 volts or so, taken with respect to reference node 416).

Preferably, as described in FIG. 3, second shunting circuit 460,468,469 comprises a third electronic switch 460, a fourth resistor 468, and a fifth resistor 469. Third electronic switch 460 is preferably realized as a NPN type bipolar junction transistor (BJT) having a first (i.e., base) terminal 462, a second (i.e., collector) terminal 464, and a third (i.e., emitter) terminal 466. Second terminal 464 is coupled to fourth connection 408. Third terminal 466 is coupled to reference node 416. Fourth resistor 468 is coupled between output 444 of microcontroller 460 and first terminal 462 of third electronic switch 460. Fifth resistor 469 is coupled between first terminal 462 (of third electronic switch 460) and reference node 416. During operation, second shunting circuit 460,468,469 functions to ensure that inverter 200 remains disabled during the shutdown period. Second shunting circuit 460,468,469 accomplishes this by preventing capacitor 282 (within inverter startup circuit 270) from charging up to a voltage (e.g., 32 volts) that is sufficient to trigger diac 290 within inverter startup circuit 270.

Microcontroller 440 is preferably realized by a suitable programmable integrated circuit, such as Part No. PIC10F200 (manufactured by Microchip, Inc.), which has the advantages of relatively low cost and low operating power requirements. Microcontroller 440 is programmed to provide the following functionality: (1) monitor the voltage at input 442, wherein an arc condition is deemed to have occurred if the voltage at input 442 falls below a predetermined level (e.g., about 0.2 volts or so with respect to reference node 416); (2) during the starting period, to set a control voltage at output 444 at a first level (e.g., less than about 0.6 volts or so with respect to reference node 416) that is insufficient to activate first and third electronic switches 450,460, and to maintain the control voltage at the first level for the duration of the starting period; (3) after completion of the starting period, if a lamp fault condition is not present, to maintain the control voltage at output 444 at the first level; (4) after completion of the starting period, if a lamp fault condition is present, to set the control voltage at output 444 at a second level (e.g., +4.3 volts or so with respect to reference node 416) that is sufficient to activate first and third electronic switches 450,460, and to maintain the control voltage at the second level for the duration of the shutdown period; and (5) after completion of the shutdown period, to set the control voltage at output 444 at the first level (in order to allow the inverter to restart), and to maintain the control voltage at the first level for the duration of the starting period. Preferably, microcontroller 440 also functions, in response to an arc condition that continues to reoccur even after a predetermined number of starting periods have been successively provided, to increase the shutdown period from a first duration (e.g., 1 second or so) to a second duration (e.g., 5 seconds or so), and to maintain the shutdown period at the second duration until at least such time as the arc condition no longer reoccurs.

Referring again to FIG. 3, in a preferred embodiment of the present invention, DC voltage supply circuit 470,476, 478,480,490 comprises a second rectifier circuit 470, a third capacitor 476, a sixth resistor 478, a voltage regulator 480, and a fourth capacitor 490. Second rectifier circuit 470 is preferably realized by a full-wave diode bridge (i.e., with four diodes) that is coupled to fifth and sixth connections 410,412 (which are coupled to auxiliary winding 132, which is magnetically coupled to a primary winding 130 of the boost inductor), a first node 472, and a second node 474. First node 472 is coupled to DC supply input 446 of microcontroller 440 and to seventh connection 414. Third capacitor 476 is coupled between first node 472 and second node 474. Sixth resistor 478 is coupled between second node 474 and ground input 448 of microcontroller 440. Voltage regulator 480 is preferably realized as a zener diode coupled between DC supply input 446 and ground input 448 of microcontroller 440. Finally, fourth capacitor 490 is coupled between seventh connection 414 and reference node 416.

During operation, DC voltage supply circuit 470,476,478, 480,490 rectifies, filters, and regulates the high frequency alternating voltage across auxiliary winding 132 of boost inductor 130 to provide a DC operating voltage (e.g., +5 volts with respect to reference node 416) for powering microcontroller 440. Advantageously, as the boost converter continues to operate (albeit with a drastically reduced duty cycle) even when inverter 200 is disabled, a DC operating voltage will continue to be provided to microcontroller 440, thereby allowing microcontroller 440 to continue to control timing and other logic functions that control the disabling and enabling of inverter 200. In this regard, it is preferred that voltage regulator 480 be realized by a zener diode (e.g., part no. 1N4688) that has a suitably low zener current, as well as a suitably low leakage current so as to maximize the period of time during which DC voltage supply circuit 470,476,478,480,490 continues to provide the DC operating voltage while inverter 200 is disabled. DC voltage supply circuit 470,476,478,480,490 also functions to ensure that the voltage at reference node 416 is negative (e.g., −5 volts) with respect to inverter ground 50; as previously explained, the provision of a negative voltage is important to the goal of promptly and properly disabling inverter 200 when a lamp fault condition is detected.

When implemented with the structure described in FIG. 3, arc protection circuit 400 is capable of being realized in cost-effective and energy efficient manner. Because the timing and logic functions are handled by a microcontroller 440, only a modest amount of associated discrete circuitry is required. Additionally, owing to the fact only a modest amount of discrete circuitry is needed, as well as to the fact that microcontroller 440 may be realized by a device (e.g., Microchip Inc. part no. PIC10F200) having relatively low operating power requirements, arc protection circuit 400 consumes very little power (e.g., around 100 milliwatts or so) and thus exerts minimal impact upon the overall energy efficiency of ballast 20.

The detailed operation of ballast 20 and arc protection circuit 400 is now explained with reference to FIGS. 2 and 3 as follows. In the following description, unless otherwise specified, all voltages are referenced with respect to inverter ground 50.

Within a short period of time after AC power is applied (via input connections 102,104) to ballast 20, boost control circuit 120 turns on and starts to provide switching of boost transistor 140. Once boost control circuit 120 turns on and starts switching boost transistor 140 on and off, corresponding voltages develop across boost inductor 130 and auxiliary winding 132. Even before the boost converter begins to operate, within inverter startup circuit 270, capacitor 282 begins to charge up via resistors 272,276; resistor 280 is sized (relative to resistors 272,276) to prevent startup of inverter 200 until at least such time as the boost converter begins to operate and provide a DC rail voltage (between output terminals 106,108) that is substantially higher than the peak of the AC supply voltage provided to input terminals 102,104. Once the voltage across capacitor 282 reaches a predetermined level (e.g., 32 volts), diac 290 becomes conductive and delivers a starting pulse (from the energy stored in capacitor 282) to the base 242 of inverter transistor 240. The starting pulse causes inverter transistor 240 to turn on, thereby initiating self-oscillating operation of inverter 200 in a manner that is well known to those skilled in the art.

Almost immediately after AC power is applied to ballast 20, the DC rail voltage that is present between outputs 106,108 of AC-to-DC converter 100 rapidly reaches the peak value (e.g., 390 volts) of the AC line source voltage (e.g., 277 volts rms), and then increases to an even higher value (e.g., 455 volts) after the boost converter begins to operate. Once the boost converter begins to operate, the voltage that develops across auxiliary winding 132 serves to provide a source of operating power for arc protection circuit 400. Consequently, arc protection circuit 400 begins to operate shortly after the boost converter begins to operate. More specifically, the alternating voltage across auxiliary winding 132 is processed by DC voltage supply circuit 470,476,478,480,490 within lamp fault protection circuit 400 to provide a regulated DC supply voltage (e.g., +5 volts) to DC supply input 446 of microcontroller 440, thereby powering microcontroller 440 and also providing a negative voltage (e.g., −5 volts with respect to inverter ground 50) at reference node 416.

Once microcontroller 440 is activated, the starting period (having a duration of between, e.g., 200 milliseconds or so and one second or so) begins. During the starting period, the control voltage at output 444 of microcontroller 440 is low (e.g., about 0.6 volts with respect to reference node 416); correspondingly, FET 450 and BJT 460 remain off. Consequently, inverter 200 is allowed operate in order to ignite and power lamps 72,74,76,78.

During normal ignition of lamps 72,74,76,78, as the lamps ignite, signals similar to those which occur during an arc condition may ordinarily occur within inverter 200 and output circuit 300. As previously discussed, it is important that such occurrences be essentially disregarded by arc protection circuit 400 in order to allow inverter 200 and output circuit 300 to operate for long enough a period of time (e.g., between 200 milliseconds or so and one second or so) in order to successfully ignite lamps 72,74,76,78. Accordingly, microcontroller 440 is programmed to effectively ignore any signals at input 442 which are indicative of an arc condition during the starting period.

At the completion of the starting period (by which point, presumably, all of the lamps are ignited and have started to operate in a substantially normal manner), arc protection circuit 400 begins to actively monitor the voltage signal, $V_X$, across tuning capacitor 370 and secondary winding 366 (of sensing transformer 360) for occurrence of an arc condition. As previously explained, the magnitude of $V_X$ will exceed a predetermined level if a high frequency signal (having a fundamental frequency that is, e.g., ten times greater than the normal operating frequency of the inverter) of sufficient magnitude is present in the currents that flow through primary windings 362,364 of sensing transformer 360. Because the secondary-side leakage inductance of sensing transformer 360 and the capacitance of capacitor 370 constitute a parallel resonant circuit having a resonant frequency that is preferably selected to be on the order of about ten times the normal operating frequency of the inverter, any corresponding high frequency component in the currents that flows through primary windings 362,364 will be reflected in the magnitude (i.e., peak value) of $V_X$. As previously explained, if $V_X$ exceeds a predetermined magnitude, arc protection circuit 400 interprets that as being indicative of an arc condition.

When $V_X$ exceeds the predetermined magnitude, within detection circuit 420, sufficient voltage develops at base 432 of transistor 430 to turn transistor 430 on. With transistor 430 turned on, the voltage at input 442 of microcontroller 440 goes low (i.e., about 0.2 volts or so, taken with respect to reference node 416). Microcontroller 440 interprets that as being indicative of an arc condition. Correspondingly, the control voltage at output 444 goes high (e.g., +4.3 volts, taken with respect to reference node 416), thereby turning on FET 450 and BJT 460. With FET 450 turned on, base 242 of inverter transistor 240 is coupled (via capacitor 418) to the negative voltage (e.g., −5 volts) at reference node 416; consequently, inverter transistor 240 will be either turned off or, if currently off, prevented from turning on again, thereby disabling inverter 200. At the same time, with BJT 460 turned on, capacitor 282 (within inverter startup circuit 270) is coupled to the negative voltage (e.g., −5 volts) at reference node 416; consequently, capacitor 282 will be prevented from charging up to a voltage (e.g., +32 volts) that is sufficient to trigger diac 290 and reinitiate operation of inverter 200. The voltage at output 444 of microcontroller 440 remains high (e.g., +4.3 volts with respect to reference node 416) for the duration of the shutdown period (e.g., 1 second). In this way, arc protection circuit 400 responds to an arc condition by promptly disabling inverter 200 and subsequently preventing inverter 200 from attempting to restart for at least a predetermined period of time (e.g., 1 second).

Upon expiration of the shutdown period (e.g., 1 second after a fault has been detected), the voltage at output 444 of microcontroller 440 goes from high (e.g., +4.3 volts with respect to reference node 416) to low (e.g., about 0.6 volts with respect to reference node 416), thereby turning off FET 450 and BJT 460. Accordingly, upon completion of the shutdown period, arc protection circuit 400 ceases to effectively shunt third and fourth connections 406,408 to reference node 416, thereby re-enabling inverter 200 (i.e., allowing inverter startup circuit 270 to restart inverter 200) and then once again allowing inverter 200 to continue to operate for at least the duration of the timed starting period (e.g., 200 milliseconds or more), during which time inverter 200 and output circuit 300 are again allowed to attempt to ignite and begin to operate lamps 72,74,76,78. In this way, arc protection circuit 400 provides automatic restart capability, which accommodates relamping without requiring cycling of the power to the ballast, and also provides a useful degree of immunity to any false/anomalous detection of arc conditions.

In the event of a recurrent arc condition (i.e., an arc condition that continues to reoccur over a consecutive number of restart cycles), arc protection circuit 400 will provide a limited number of restart attempts (e.g., 10 or so, in accordance with the previous description), but then transition to a different mode of operation in which the shutdown period is significantly increased (e.g., from about 1 second to about 5 seconds or so). This increase in the shutdown period not only serves to prevent frequent (and annoying) flashing of any operational lamps, but also reduces needless stress upon the components in inverter 200 and output circuit 300. The shutdown period will remain at the increased value for as long as an arc condition continues to reoccur. At some future point when, presumably, the arc condition no longer reoccurs with each restart cycle, arc protection circuit 400 reverts to its normal operating mode (i.e., FET 450 and BJT 460 will be turned off and remain off), thereby allowing inverter 200 to operate in a normal manner, until at least such time as a lamp fault condition subsequently occurs (in which case the aforementioned events will be repeated).

Preferred component values for implementing arc protection circuit 400 are listed as follows:
Capacitor 418: 220 picofarad
Diode bridge 422: 1N4148 (4 diodes)
Capacitor 424: 330 picofarad
Resistor 426: 4.7 kilohm
Resistor 428: 1.8 kilohm
Transistor 430: 2N3904
Resistor 438: 10 kilohm
Microcontroller 440: Part No. PIC10F200 (mfd. by Microchip, Inc.)
Transistor 450: 2N7002 or FDC301N
Transistor 460: 2N3904
Resistor 468: 47 kilohm
Diode bridge 470: 1N4148 (4 diodes)
Capacitor 476: 100 microfarad
Resistor 478: 15 kilohm
Zener diode 480: 4.7 volt (Part No. 1N4688)
Capacitor 490: 33 micofarad Although the present invention has been described with reference to certain preferred embodiments, numerous modifications and variations can be made by those skilled in the art without departing from the novel spirit and scope of this invention.

What is claimed is:

1. A ballast for powering at least one gas discharge lamp, the ballast comprising:
    an inverter having a normal operating frequency;
    an output circuit coupled to the inverter, the output circuit comprising output connections adapted for coupling to a lamp load comprising at least one gas discharge lamp; and
    an arc protection circuit coupled to the inverter and to the output circuit, wherein the arc protection circuit is operable:
        (a) to monitor an electrical signal within the output circuit for indication of an arc condition, wherein an arc condition is deemed to have occurred when the electrical signal includes a high frequency component having:
            (i) a magnitude that exceeds a predetermined threshold value; and
            (ii) a fundamental frequency that is on the order of at least ten times greater than the normal operating frequency of the inverter;
        (b) to provide a starting period wherein the inverter is enabled and allowed to attempt to start the lamp, independent of occurrence of an arc condition;
        (c) in response to occurrence of an arc condition after completion of the starting period:
            (i) to disable the inverter and to keep the inverter disabled for a shutdown period; and
            (ii) after completion of the shutdown period, to again provide the starting period whereby the inverter is enabled and allowed to attempt to start the lamp, independent of occurrence of an arc condition.

2. The ballast of claim 1, wherein the inverter is at least one of:
    (i) a self-oscillating type inverter;
    (ii) a current-fed type inverter; and
    (iii) a bridge type inverter.

3. The ballast of claim 1, wherein:
    the inverter is a half-bridge type inverter; and
    the output circuit includes a parallel resonant circuit.

4. The ballast of claim 1, wherein the arc protection circuit is further operable, in response to an arc condition that continues to reoccur after a predetermined number of starting periods have been successively provided, to increase the shutdown period from a first duration to a second duration, and to maintain the shutdown period at the second duration until at least such time as the arc condition no longer reoccurs.

5. The ballast of claim 4, wherein:
the first duration is on the order of about one second;
the second duration is on the order of between about five seconds and about one minute; and
the predetermined number of starting periods is on the order of about ten.

6. The ballast of claim 1, wherein:
the ballast further comprises an AC-to-DC converter having an input for receiving an AC supply voltage and an output for providing a DC rail voltage to the inverter;
the inverter comprises: (i) first and second inverter transistors; (ii) a first base drive circuit coupled to the first inverter transistor; (iii) a second base drive circuit coupled to the second inverter transistor; (iv) an inverter ground; and (v) an inverter startup circuit coupled to the AC-to-DC converter, the second inverter transistor, and the inverter ground;
the arc protection circuit comprises a plurality of connections, including first and second connections (402,404) coupled to the output circuit, a third connection (406) coupled to the second inverter transistor and the second base drive circuit, a fourth connection (408) coupled to the inverter startup circuit, fifth and sixth connections (410,412) coupled to the AC-to-DC converter, and a seventh connection (414) coupled to the inverter ground; and
the arc protection circuit is further operable such that:
the electrical signal that is monitored by the arc protection circuit comprises a voltage signal within the output circuit, wherein the electrical signal is monitored via the first and second connections;
during the starting period, the inverter is enabled and allowed to attempt to start the lamp, regardless of the nature of the voltage signal that is monitored via the first and second connections;
in response to occurrence of an arc condition after completion of the starting period, the inverter is disabled by effectively shunting the third connection and the fourth connection to a negative voltage for the duration of the shutdown period; and
upon completion of the shutdown period, the inverter is re-enabled for the starting period by ceasing to effectively shunt the third and fourth connections to the negative voltage for the duration of the starting period.

7. The ballast of claim 6, wherein the output circuit comprises:
an output transformer having a primary winding (320) and a secondary winding (322);
a plurality of output connections comprising at least a first output connection (302) and a return output connection (310);
a sensing transformer (360), comprising:
a first primary winding (362) coupled between the secondary winding (322) of the output transformer and at least the first output connection (302);
a second primary winding (364) coupled between the secondary winding (322) of the output transformer and the return output connection (310); and
a secondary winding (366) that is magnetically coupled to the first and second primary windings (362,366); and
a tuning capacitor (370) coupled in parallel with the secondary winding (366) of the sensing transformer (370) and coupled to the first and second connections (402,404) of the arc protection circuit (400).

8. The ballast of claim 7, wherein:
the sensing transformer (360) has a secondary-side magnetizing inductance; and
the secondary-side magnetizing inductance of the sensing transformer (360) and the capacitance of the tuning capacitor (370) together comprise a parallel resonant circuit having a natural resonant frequency that is on the order of at least ten times greater than the normal operating frequency of the inverter.

9. The ballast of claim 6, wherein the arc protection circuit further comprises:
a microcontroller (440) having an input (442), an output (444), a DC supply input (446), and a ground input (448), wherein the DC supply input (446) is coupled to the seventh connection (414) and the ground input (448) is coupled to a reference node (416);
a detection circuit (422,424,426,428,430,438) coupled between the first and second connections (402,404) and the input (442) of the microcontroller (422);
a first shunting circuit (418,450) coupled to the third connection (406), the output (444) of the microcontroller, and the reference node (416);
a second shunting circuit (460,468) coupled to the fourth connection (408), the output (444) of the microcontroller, and the reference node (416); and
a DC voltage supply circuit (470,476,478,480,490) coupled to the fifth and sixth connections (410,412), the DC supply input (446) of the microcontroller, the seventh connection (414), and the reference node (416).

10. The ballast of claim 9, wherein the negative voltage is on the order of about −5 volts with respect to the inverter ground.

11. The ballast of claim 9, wherein the first shunting circuit comprises:
a first electronic switch (450) having first, second, and third terminals (452,454,456), wherein the first terminal (452) is coupled to the output (444) of the microcontroller (440), and the third terminal (456) is coupled to the reference node (416); and
a first capacitor (418) coupled between the third connection (406) and the second terminal (454) of the first electronic switch (450).

12. The ballast of claim 11, wherein the detection circuit comprises:
a first rectifier circuit (422) coupled to the first and second connections (402,404);
a second capacitor (424) coupled between the first rectifier circuit (422) and the reference node (416);
a second electronic switch (430) having a first terminal (432), a second terminal (434), and a third terminal (436), wherein the third terminal (436) is coupled to the reference node (416);
a first resistor (426) coupled between the first rectifier circuit (422) and the first terminal (432) of the second electronic switch (430);
a second resistor (428) coupled between the first terminal (432) of the second electronic switch (430) and the reference node (416); and
a third resistor (438) coupled between the DC supply input (446) of the microcontroller (440) and the second terminal (434) of the second electronic switch (430).

13. The ballast of claim 12, wherein the second shunting circuit comprises:
a third electronic switch (460) having a first, second, and third terminals (462,464,466), wherein the second terminal (464) is coupled to the fourth connection (408) and the third terminal (466) is coupled to the reference node (416);

a fourth resistor (468) coupled between the first terminal (462) of the third electronic switch (460) and the output (444) of the microcontroller (440); and a fifth resistor (469) coupled between the first terminal of the third electronic switch and the reference node.

14. The ballast of claim 13, wherein:

the first electronic switch (450) is a N-channel field effect transistor, wherein the first terminal (452) is a gate terminal, the second terminal (454) is a drain terminal, and the third terminal (456) is a source terminal;

the second electronic switch (430) is a NPN type bipolar junction transistor, wherein the first terminal (432) is a base terminal, the second terminal (434) is a collector terminal, and the third terminal (436) is an emitter terminal; and the third electronic switch (460) is a NPN type bipolar junction transistor, wherein the first terminal (462) is a base terminal, the second terminal (464) is a collector terminal, and the third terminal (466) is an emitter terminal.

15. The ballast of claim 13, wherein the microcontroller is operable to:

monitor a voltage at the input (442) of the microcontroller (440), wherein an arc condition is deemed to have occurred if the voltage at the input (442) falls below a predetermined level;

during the starting period, to set a control voltage at the output of the microcontroller at a first level that is insufficient to activate the first and third electronic switches, and to maintain the control voltage at the first level for the duration of the starting period;

after completion of the starting period:
if an arc condition is not present, to maintain the control voltage at the first level;
if an arc condition is present, to set the control voltage at the output of the microcontroller at a second level that is sufficient to activate the first and third electronic switches, and to maintain the control voltage at the second level for the duration of the shutdown period; and after completion of the shutdown period, to set the control voltage at the output of the microcontroller at the first level, and to maintain the control voltage at the first level for the duration of the starting period.

16. The ballast of claim 15, wherein:

the first level of the control voltage is set at about 0.6 volts with respect to the reference node; and the second level of the control voltage is set at about +4.3 volts with respect to the reference node.

17. The ballast of claim 15, wherein the microcontroller is further operable, in response to an arc condition that continues to reoccur after a predetermined number of starting periods have been successively provided, to increase the shutdown period from a first duration to a second duration, and to maintain the shutdown period at the second duration until at least such time as an arc condition no longer reoccurs.

18. The ballast of claim 13, wherein the DC voltage supply circuit comprises:

a second rectifier circuit (470) coupled to the fifth and sixth connections (410,412), a first node (472), and a second node (474), wherein the first node (472) is coupled to the DC supply input (446) of the microcontroller (440) and to the seventh connection (414);

a third capacitor (476) coupled between the first and second nodes (472,474);

a sixth resistor (478) coupled between the second node (474) and the ground input (448) of the microcontroller (440);

a voltage regulator (480) coupled between the DC supply and ground inputs (446,448) of the microcontroller (440); and a fourth capacitor (490) coupled between the seventh connection (414) and the reference node (416).

19. The ballast of claim 18, wherein:

the AC-to-DC converter comprises a full-wave rectifier (110) and a boost converter (120,130,140,150,160), wherein the boost converter includes a boost inductor having a primary winding (130) and an auxiliary winding (132) that is magnetically coupled to the primary winding; and the fifth and sixth connections (410,412) of the arc protection circuit are coupled to the auxiliary winding (132) of the boost inductor.

* * * * *